United States Patent
Hsieh et al.

(10) Patent No.: US 8,781,789 B2
(45) Date of Patent: Jul. 15, 2014

(54) METHOD FOR DETERMINING INCLINE ANGLE OF ELECTROMAGNETIC POINTER

(75) Inventors: Cheng-Liang Hsieh, Hsin-Chu (TW); Yun-Hsiang Yeh, Miaoli (TW); Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 589 days.

(21) Appl. No.: 12/777,873

(22) Filed: May 11, 2010

(65) Prior Publication Data

US 2011/0282624 A1    Nov. 17, 2011

(51) Int. Cl.
*G01C 9/02* (2006.01)
*G01R 27/26* (2006.01)

(52) U.S. Cl.
USPC .............................. 702/154; 702/65; 702/151

(58) Field of Classification Search
USPC ........................................... 702/154, 65, 151
See application file for complete search history.

(56) References Cited

U.S. PATENT DOCUMENTS

| | | | |
|---|---|---|---|
| 5,109,225 A * | 4/1992 | Morita | 341/5 |
| 5,675,130 A * | 10/1997 | Sekizawa | 178/18.07 |
| 5,748,110 A * | 5/1998 | Sekizawa et al. | 341/5 |
| 5,751,229 A * | 5/1998 | Funahashi | 341/5 |
| 5,898,136 A * | 4/1999 | Katsurahira | 178/18.01 |

FOREIGN PATENT DOCUMENTS

| | | | | |
|---|---|---|---|---|
| JP | 56-108182 | | 8/1981 | |
| JP | 62-099824 | | 5/1987 | |
| JP | 62-099824 | * | 9/1987 | ............... G06F 3/03 |
| JP | 03-175522 | | 7/1991 | |
| JP | 04-024721 | | 1/1992 | |
| JP | 07-295729 | | 11/1995 | |
| JP | 08-305480 | * | 11/1996 | ............... G06F 3/03 |
| JP | 2002-267406 | * | 9/2002 | ............... G06F 3/03 |

OTHER PUBLICATIONS

Translation of Japanese Patent Office Action dated Dec. 20, 2011. 2 pages.

* cited by examiner

*Primary Examiner* — Michael Nghiem
*Assistant Examiner* — Alexander Satanovsky
(74) *Attorney, Agent, or Firm* — Huffman Law Group, P.C.

(57) ABSTRACT

A method for determining an incline angle of electromagnetic pointer is disclosed. The method comprises the following steps. First of all, an electromagnetic input pen/stylus is provided over antennas $X_n/Y_n$ along X/Y axes. Then a plurality of antennas at two sides of the antennas $X_n/Y_n$ are scanned. Next the signal distributions of the antennas $X_n/Y_n$ and the antennas at two side are analyzed. Then the number of antenna sampled of the signal distributions of the antennas at two side is determined. Next the antennas at two side are selected and the signal distributions are sampled and received according to the number of antenna sampled. Finally, an incline angle of the electromagnetic pointer is determined according to the sampled signal distributions.

3 Claims, 3 Drawing Sheets

US 8,781,789 B2

METHOD FOR DETERMINING INCLINE ANGLE OF ELECTROMAGNETIC POINTER

FIELD OF THE INVENTION

The present invention relates to a method for an electromagnetic pointer, and more particularly to a method for determining incline angle of an electromagnetic pointer.

DESCRIPTION OF THE PRIOR ART

The conventional methods for determining the incline angle of an electromagnetic pointer disclosed in U.S. Pat. No. 5,751,229 and U.S. Pat. No. 5,748,110 involve the processing of signals emitted from an electromagnetic pen through signal amplifying, filtering, rectifying, phase detecting and analog to digital conversion to generate voltage signals and the corresponding x and y coordinates of the position of the electromagnetic pen. The angular information of the electromagnetic pen relates to the induction voltage signal corresponding to the x and y coordinates pointed by the electromagnetic pen. When the electromagnetic pen is perpendicular to the antennas or sensor coils of a digitizer, the induction voltage signal with a peak value only presents on the antenna or sensor coil corresponding to the coordinate of the electromagnetic pen. When the electromagnetic pen tilts or is not perpendicular to the antennas or sensor coils of a digitizer, not only the induction voltage signal with a main peak value presents on the antenna or sensor coil corresponding to the coordinate of the electromagnetic pen, the induction voltage signals with at least on auxiliary peak values or sub peak values present on the antenna or sensor coil next to the coordinate of the electromagnetic pen. The inclined angle of the electromagnetic pen is calculated and obtained through employing the main peak values and auxiliary peak values of the induction voltage signal distributions in the x axial and y axial directions.

However, the above-mentioned method for determining the incline angle of an electromagnetic pen or stylus which uses the main peak values and auxiliary peak values of the induction voltage signal distribution to calculate the incline angle has several drawbacks. For example, if the electromagnetic pen is not close to the digitizer and maintains a distance away from the digitizer, and the electromagnetic pen tilts only along the y axial direction, the ratio of the main peak induction-voltage to the auxiliary peak induction-voltage will vary along with the distance between pen and the digitizer. Furthermore, the ratio of the main peak induction-voltage to the auxiliary peak induction-voltage will be different when pen at different location. That is to say, the accuracy of the inclined angle calculation would be affected which in turn increasing the error and the complexity of the inclined angle calculation.

In order to solve the above-mentioned drawbacks of conventional method for determining the incline angle of an electromagnetic pen or stylus, the invention provides a method for determining incline angle of an electromagnetic pointer to effectively resolve the error and the complexity of the inclined angle calculation of the conventional method for determining the incline angle of an electromagnetic pointer.

SUMMARY OF THE INVENTION

An object of the present invention is to provide a method for determining incline angle of an electromagnetic pointer by sampling the voltage signal distribution of the antennas or sensor coils arranged on two sides of the center antenna or sensor coil to calculate the incline angle of the electromagnetic pointer without the error or inaccuracy resulting from the distance variation between the electromagnetic pen and the digitizer.

According to the object, one embodiment of this presented invention is provided as this procedure:
1. An electromagnetic pointer (pen) located on a sensor coil $X_n/Y_n$ is provided.
2. Scan a plurality of sensor coils on two sides of the sensor coil $X_n/Y_n$.
3. X and Y induced voltage distribution of the sensor coils is obtained and analyzed.
4. Number "a" of the sensor coils selected to calculate the incline angle of the electromagnetic pointer is determined.
5. Number a of the sensor coils on two sides of the sensor coil $X_n/Y_n$ respectively is selected to receive electromagnetic signals from the electromagnetic pointer and obtain a induced voltage distribution of the sensor coils selected.
6. The incline angle of the electromagnetic pointer is calculated according to the signal distribution of the sensor coils selected.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1:
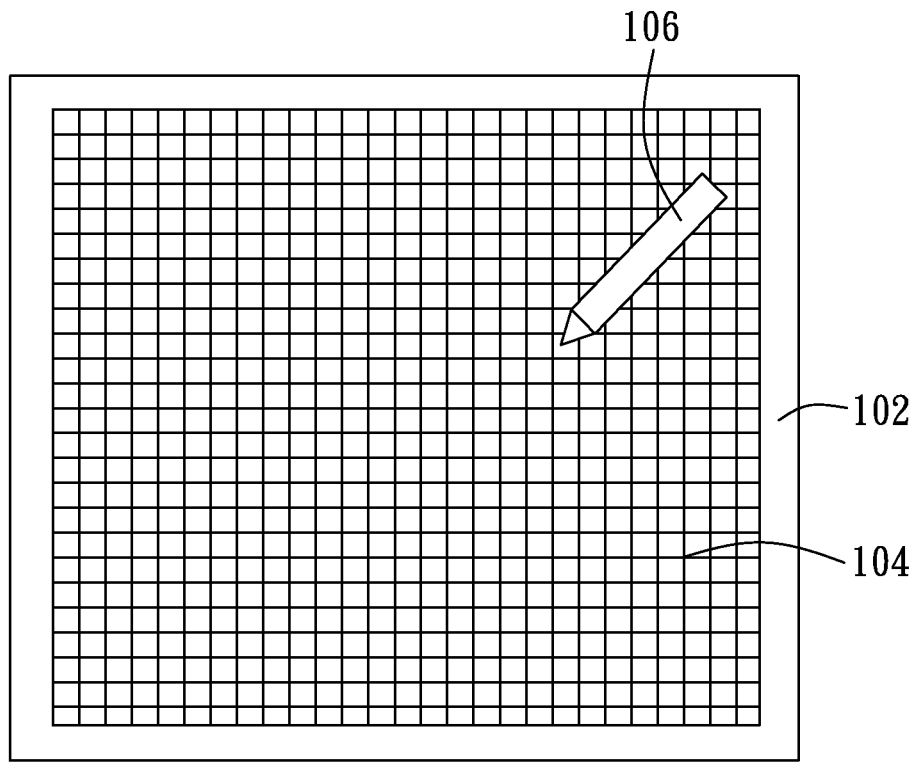
FIG. 1 shows one embodiment of an electromagnetic input system of the invention.

FIG. 1 shows one embodiment of an electromagnetic input system of the invention. The electromagnetic input system comprises an electromagnetic sensing substrate 102 such as a digitizer and an electromagnetic pointer 106 such as a stylus. The electromagnetic sensing substrate 102 or digitizer includes an antenna or sensor area 104 with a plurality of partially overlapped antennas or sensor coils arranged along x and y axial directions, and a controller unit (not shown) and a signal process unit (not shown). The controller unit comprises a micro-controller unit (MCU) and the signal process unit includes switches, multiplexers, a signal filter, signal amplifiers, phase detectors and analog to digital converter (A/D converter). The electromagnetic pointer 106 comprises a batteryless stylus with a resonance circuit and a stylus powered by battery. The coordinate of the electromagnetic pointer 106 on the antenna or sensor area 104 is calculated and obtained through the transmitting and receiving of electromagnetic wave signals between the antennas or sensor coils and the electromagnetic pointer.

Figure 2:
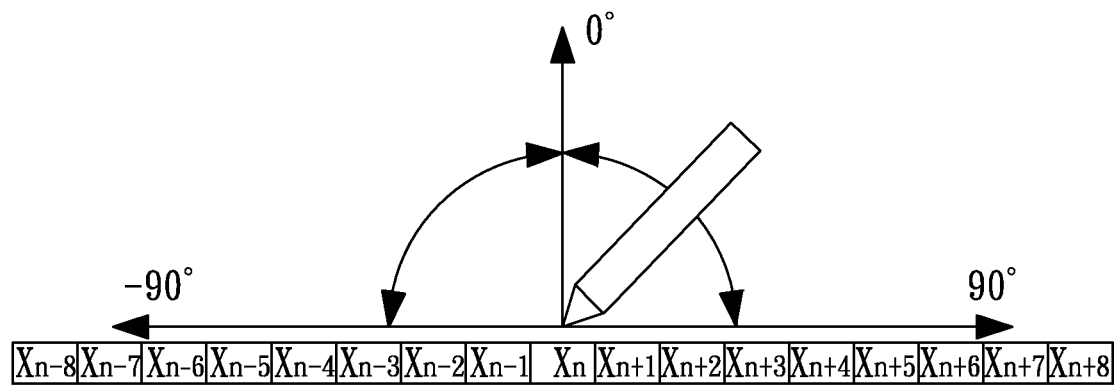
FIG. 2 shows a schematic diagram of an electromagnetic pointer on a region $(X_{n-8} \sim X_{n+8})$ of an antenna or sensor area tilts with an incline angle.

FIG. 2 shows a schematic diagram of an electromagnetic pointer on a region ($X_{n-8}$~$X_{n+8}$) of an antenna or sensor area tilts with an incline angle. In FIG. 2, the incline angle is defined as 0° if the electromagnetic pointer is perpendicular to the antenna or sensor area of the electromagnetic input system, the incline angle is defined as 90° if the electromagnetic pointer tilts right toward and parallel to the antenna or sensor area of the electromagnetic input system, the incline angle is defined as −90° if the electromagnetic pointer tilts left toward and parallel to the antenna or sensor area of the electromagnetic input system.

Figure 3:
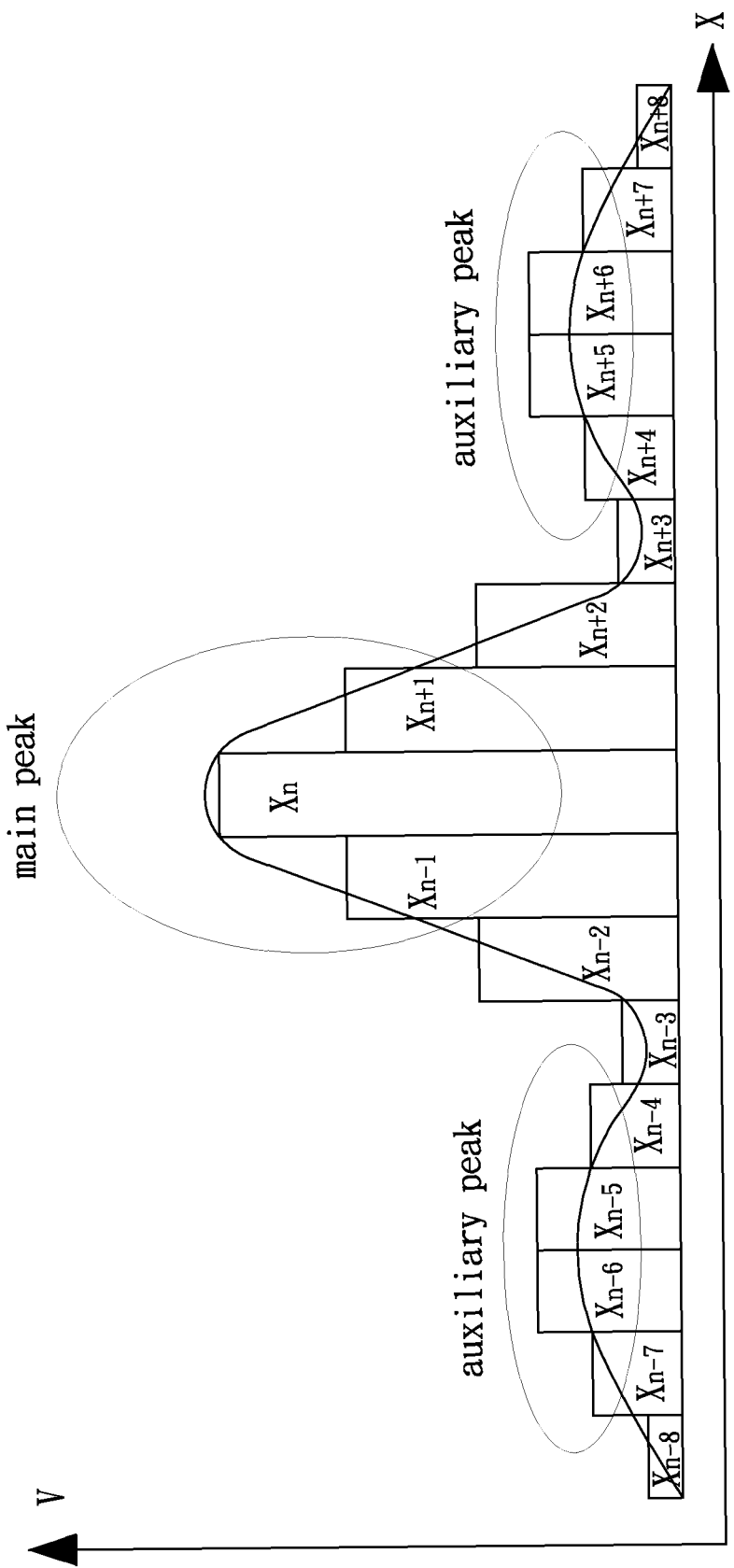
FIG. 3 shows a schematic diagram of induced voltage signal distribution versus coordinate on the antenna or sensor area of the electromagnetic input system along x axial direction.

FIG. 3 shows a schematic diagram of voltage signal distribution versus coordinate on the antenna or sensor area of the electromagnetic input system along x axial direction. In FIG. 3, the voltage signal distribution has one main peak value and two auxiliary peak values, wherein the transverse axis represents the coordinates of the antennas or sensor coils and the longitudinal axis represents the voltage values sensed by the antennas or sensor coils. It is obvious that a similar voltage signal distribution versus coordinate on the antenna or sensor area of the electromagnetic input system along y axial direction is also able to be obtained. Although the example described is about voltage signal distribution versus coordinate on the antenna or sensor area of the electromagnetic input system along x axial direction, similar example along y axial direction could be easily anticipated When the electromagnetic pointer is on antenna or sensor coil $X_n$ of the antennas or sensor coils arranged along x axial direction, a plurality of antennas or sensor coils arranged on two sides of the antenna or sensor coil $X_n$ are scanned to obtained the voltage signal distribution versus coordinate on the antenna or sensor area of the electromagnetic input system along x axial direction. Since the electromagnetic induced voltage signal distribution of the antennas or sensor coils arranged on two sides of the center antenna or sensor coil $X_n$ with a main peak value has a symmetric feature, the voltage signal distribution of the antennas or sensor coils arranged on two sides of the center antenna or sensor coil $X_n$ is sampled to calculate the incline angle of the electromagnetic pointer. The voltage signal distribution of the center antenna or sensor coil $X_n$ is not utilized to calculate the incline angle of the electromagnetic pointer to prevent the error or inaccuracy resulting from the distance variation between the electromagnetic pen and the digitizer. The proportion of voltage signal distribution of the antennas or sensor coils arranged on two sides of the center antenna or sensor coil $X_n$ would not vary along with the distance variation between the electromagnetic pen and the digitizer. Thus when the electromagnetic pointer tilts or lifts away from the digitizer, employing same number of the antennas or sensor coils arranged on two sides of the center antenna or sensor coil $X_n$ to calculate the incline angle of the electromagnetic pointer can prevent the error or inaccuracy resulting from the distance variation between the electromagnetic pen and the digitizer. The employing of the antennas or sensor coils arranged on two sides of the center antenna or sensor coil $X_n$ employed comprises the summation of voltage signals of the antennas or sensor coils arranged on two sides of the center antenna or sensor coil $X_n$. The number of the antennas or sensor coils arranged on two sides of the center antenna or sensor coil $X_n$ employed can be arbitrary, odd or even. When calculating the incline angle of the electromagnetic pointer, only the antennas or sensor coils arranged on two sides of the center antenna or sensor coil $X_n$ need to be selected by the controller unit through a multiplexer and switches while the center antenna or sensor coil $X_n$ does not need to be selected.

FIGS. 2 and 3 show the first embodiment of the present invention. When the electromagnetic pointer is placed on the antenna or sensor coil $X_n$, 8 antennas or sensor coils on both sides of the antenna or sensor coil $X_n$ are selected or scanned, wherein the antennas or sensor coils $X_{n-1}$~$X_{n-8}$ and $X_{n+1}$~$X_{n+8}$ are on the left and right sides of the center antenna or sensor coil $X_n$ respectively. Then voltage signal distribution including a main peak value of antennas or sensor coils $X_{n-2}$~$X_{n+2}$, auxiliary or sub peak values of antennas or sensor coils $X_{n-7}$~$X_{n-4}$ and $X_{n+4}$~$X_{n+7}$ is obtained.

When calculating the incline angle of the electromagnetic pointer, only antennas or sensor coils $X_{n-7}$~$X_{n-4}$ and $X_{n+4}$~$X_{n+7}$ need to be selected by the controller unit through a multiplexer and switches, and the voltage signals of antennas or sensor coils $X_{n-7}$~$X_{n-4}$ and $X_{n+4}$~$X_{n+7}$ are summed respectively.

The total values of the voltage signals of antennas or sensor coils $X_{n-7}$~$X_{n-4}$ and $X_{n+4}$~$X_{n+7}$ are treated as the left and right auxiliary or sub peak values of the voltage signals of antennas or sensor coils $X_{n-7}$~$X_{n-4}$ and $X_{n+4}$~$X_{n+7}$ respectively. Then the incline angle of the electromagnetic pointer is calculated according to the following embodiments.

The incline angle of the electromagnetic pointer is calculated according to the ratio or proportion between the left and right auxiliary or sub peak values of the voltage signals of antennas or sensor coils. For example, when the electromagnetic pointer is perpendicular to the digitizer, the right auxiliary peak value equals the left auxiliary peak value;

right auxiliary peak value/(right auxiliary peak value+ left auxiliary peak value)=½→incline angle=0;

when the electromagnetic pointer tilts toward to right and parallel to the digitizer, the right auxiliary peak value is much larger than the left auxiliary peak value;

right auxiliary peak value/(right auxiliary peak value+ left auxiliary peak value)≈1→incline angle=90°;

when the electromagnetic pointer tilts toward to left and parallel to the digitizer, the left auxiliary peak value is much larger than the right auxiliary peak value;

right auxiliary peak value/(right auxiliary peak value+ left auxiliary peak value)≈0→incline angle=− 90°;

right auxiliary peak value/(right auxiliary peak value+ left auxiliary peak value)=ratio B;

0≤ratio B≤1;

the ratio B corresponds to the incline angle of the electromagnetic pointer.

The above-mentioned embodiment can also use the following similar equation:

left auxiliary peak value/(right auxiliary peak value+ left auxiliary peak value)=ratio B'.

The second embodiment of the present invention uses the difference between the left and right auxiliary or sub peak values of the voltage signals of antennas or sensor coils to calculate the incline angle of the electromagnetic pointer. When the electromagnetic pointer is placed on the antenna or sensor coil $X_n$, 8 antennas or sensor coils on both sides of the antenna or sensor coil $X_n$ are selected or scanned, wherein the antennas or sensor coils $X_{n-1}$~$X_{n-8}$ and $X_{n+1}$~$X_{n+8}$ are on the left and right sides of the center antenna or sensor coil $X_n$ respectively. Then voltage signal distribution including a main peak value of antennas or sensor coils $X_{n-2}$~$X_{n+2}$, auxiliary or sub peak values of antennas or sensor coils $X_{n-7}$~$X_{n-4}$ and $X_{n+4}$~$X_{n+7}$ is obtained.

When calculating the incline angle of the electromagnetic pointer, only antennas or sensor coils $X_{n-5}$ and $X_{n+5}$ need to be selected by the controller unit through a multiplexer and switches, and the voltage signals of antennas or sensor coils $X_{n-5}$ and $X_{n+5}$ are selected.

The values of the voltage signals of antennas or sensor coils $X_{n-5}$ and $X_{n+5}$ are treated as the left and right auxiliary or sub peak values of the voltage signals of antennas or sensor coils $X_{n-7}$~$X_{n-4}$ and $X_{n+4}$~$X_{n+7}$ respectively. Then the incline angle of the electromagnetic pointer is calculated according to the following embodiments.

The incline angle of the electromagnetic pointer is calculated according to the difference between the left and right auxiliary or sub peak values of the voltage signals of antennas or sensor coils. For example, when the electromagnetic pointer is perpendicular to the digitizer, the right auxiliary peak value equals the left auxiliary peak value;

right auxiliary peak value−left auxiliary peak value=0→incline angle=0;

when the electromagnetic pointer tilts toward to right and parallel to the digitizer, the right auxiliary peak value is much larger than the left auxiliary peak value;

right auxiliary peak value−left auxiliary peak value=right auxiliary peak value→incline angle=90°;

when the electromagnetic pointer tilts toward to left and parallel to the digitizer, the left auxiliary peak value is much larger than the right auxiliary peak value;

right auxiliary peak value−left auxiliary peak value≈− left auxiliary peak value→incline angle=−90°;

right auxiliary peak value−left auxiliary peak value=difference A;

left auxiliary peak value≤difference A≤right auxiliary peak value;

the difference A corresponds to the incline angle of the electromagnetic pointer.

Figure 4:
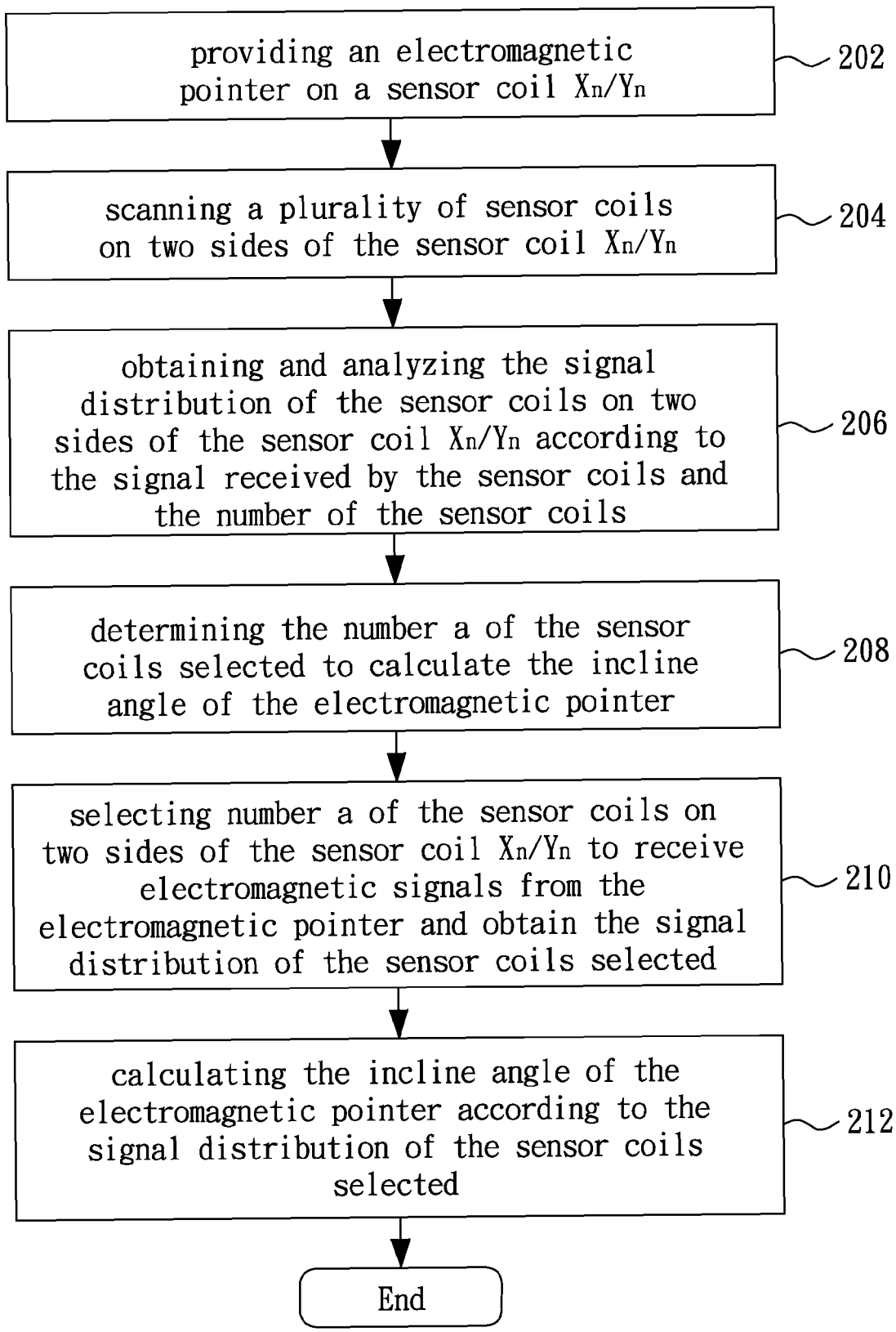
FIG. 4 shows a flow chart of one embodiment of the method for determining incline angle of an electromagnetic pointer of the invention.

The above-mentioned embodiment can also use the following similar equation:

left auxiliary peak value−right auxiliary peak value=difference A'. Although the above example described is about the calculation of the incline angle of the electromagnetic pointer on the digitizer along x axial direction, similar example along y axial direction could be easily anticipated FIG. 4 shows a flow chart of one embodiment of the method for determining incline angle of an electromagnetic pointer of the invention. First of all, in step 202, an electromagnetic pointer is provided on an antenna or sensor coil $X_n/Y_n$. Then in step 204, a plurality of antennas or sensor coils on two sides of the antenna or sensor coil $X_n/Y_n$ are scanned. Next in step 206, the signal distribution of the antennas or sensor coils on two sides of the antenna or sensor coil $X_n/Y_n$ is obtained and analyzed according to the signal received by the antennas or sensor coils and the number of the antennas or sensor coils. Then in step 208, the number a of the antennas or sensor coils selected to calculate the incline angle of the electromagnetic pointer is determined. Next in step 210, number a of the antennas or sensor coils on two sides of the antenna or sensor coil $X_n/Y_n$ are selected to receive electromagnetic signals from the electromagnetic pointer and obtain the signal distribution of the antennas or sensor coils selected. Finally, in step 212, the incline angle of the electromagnetic pointer is calculated according to the signal distribution of the antennas or sensor coils selected.

The invention utilizes the signal distribution of the antennas or sensor coils on two sides of the location of the electromagnetic pointer to calculate the incline angle of the electromagnetic pointer. The signal distribution of the antennas or sensor coil on the location of the electromagnetic pointer is ignored to avoid the error resulting from the distance variation between the electromagnetic pen and the digitizer and improve the accuracy of the calculation of the incline angle of the electromagnetic pointer.

Although specific embodiments have been illustrated and described, it will be appreciated by those skilled in the art that various modifications may be made without departing from the scope of the present invention, which is intended to be limited solely by the appended claims.

What is claimed is:

1. A method for determining an incline angle of an electromagnetic pointer, said method comprising:
providing an electromagnetic pointer on a first sensor coil; scanning a plurality of sensor coils on two sides of the first sensor coil respectively; obtaining a signal distribution of the sensor coils;
determining a number of second sensor coils from the sensor coils to calculate the incline angle of the electromagnetic pointer;
selecting the second sensor coils on two sides of the first sensor coil respectively to receive electromagnetic signals from the electromagnetic pointer and obtain a signal distribution of the second sensor coils selected; and
calculating the incline angle of the electromagnetic pointer according to a ratio between auxiliary peak value of the second sensor coils on one side of the first sensor coil and a sum of two auxiliary peak values of two second sensor coils on two sides of the first sensor coil.

2. The method according to claim 1, wherein the number is from 1 to 8.

3. The method according to claim 1, wherein a number of the sensor coils on two sides of the first sensor coil are scanned, the number is from 1 to 8.

\* \* \* \* \*